(12) United States Patent
Coaplen et al.

(10) Patent No.: US 11,718,362 B2
(45) Date of Patent: Aug. 8, 2023

(54) CROWN AIR VOLUME

(71) Applicant: Fox Factory, Inc., Duluth, GA (US)

(72) Inventors: Joshua Coaplen, Asheville, NC (US); Christopher Otterness, Asheville, NC (US); Daniel McCormick, Santa Cruz, CA (US)

(73) Assignee: Fox Factory, Inc., Duluth, GA (US)

( * ) Notice: Subject to any disclaimer, the term of this patent is extended or adjusted under 35 U.S.C. 154(b) by 0 days.

(21) Appl. No.: 17/158,837

(22) Filed: Jan. 26, 2021

(65) Prior Publication Data

US 2021/0237824 A1 Aug. 5, 2021

Related U.S. Application Data

(60) Provisional application No. 62/968,905, filed on Jan. 31, 2020.

(51) Int. Cl.
*B62K 21/04* (2006.01)
*B62K 25/08* (2006.01)
*B62K 25/04* (2006.01)

(52) U.S. Cl.
CPC .............. *B62K 21/04* (2013.01); *B62K 25/08* (2013.01); *B62K 2025/044* (2013.01); *B62K 2025/048* (2013.01); *B62K 2201/08* (2013.01)

(58) Field of Classification Search
CPC ................ B62K 21/04; B62K 2201/08; B62K 2025/048; B62K 2025/044
USPC ......................................................... 280/276
See application file for complete search history.

(56) References Cited

U.S. PATENT DOCUMENTS

| | | | | |
|---|---|---|---|---|
| 703,632 | A * | 7/1902 | Zimmerman | B62K 25/08 280/276 |
| 5,626,355 | A * | 5/1997 | Voss | B62K 25/08 188/DIG. 1 |
| 5,725,226 | A * | 3/1998 | Cabrerizo-Pariente | B62K 25/08 188/300 |
| 6,095,542 | A * | 8/2000 | Allen | B62K 21/04 280/279 |
| 7,222,869 | B2 * | 5/2007 | Chen | B62K 21/04 280/276 |
| 8,770,609 | B2 * | 7/2014 | Dodman | B62M 3/00 280/279 |
| 2022/0318444 | A1 | 10/2022 | Coaplen et al. | |

\* cited by examiner

*Primary Examiner* — Jacob B Meyer
*Assistant Examiner* — Hosam Shabara

(57) ABSTRACT

A crown assembly including at least one crown fluid chamber having a first volume, and a fork side opening for fluidly coupling the at least one crown fluid chamber with at least one fluid spring chamber of a fork leg to provide an additional amount of available fluid volume to the at least one fluid spring chamber.

19 Claims, 8 Drawing Sheets

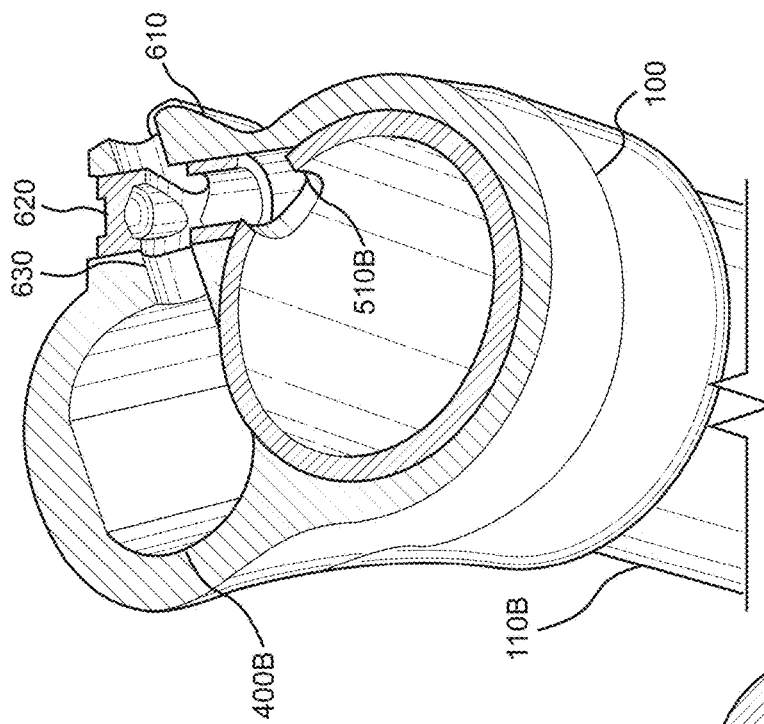
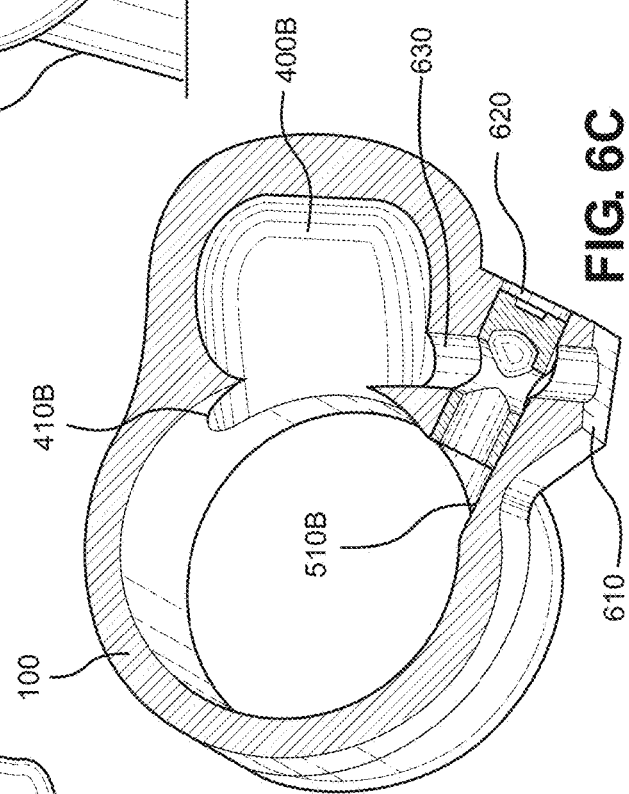
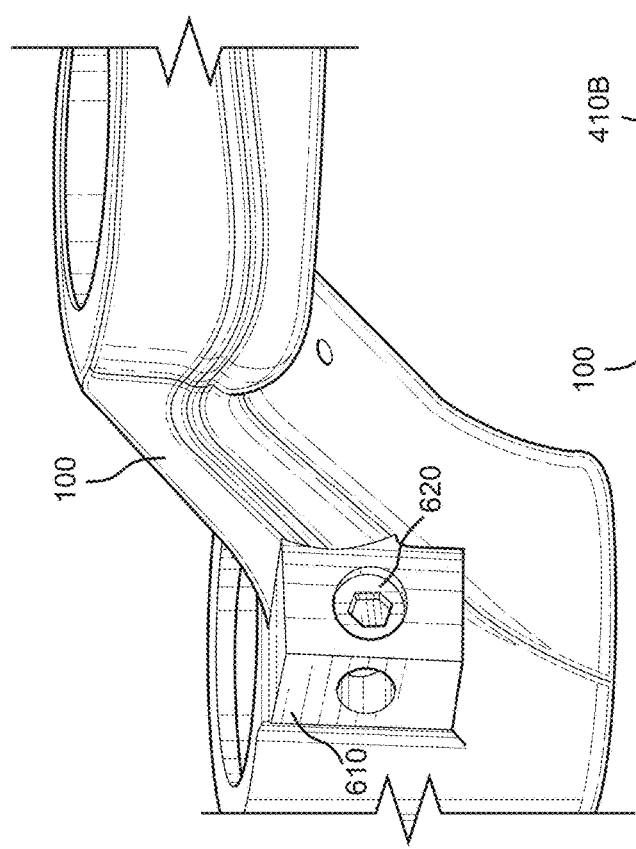
FIG. 6A
FIG. 6B
FIG. 6C

CROWN AIR VOLUME

CROSS-REFERENCE TO RELATED APPLICATIONS (PROVISIONAL)

This application claims priority to and benefit of U.S. Provisional Patent Application No. 62/968,905 filed on Jan. 31, 2020, entitled "CROWN AIR VOLUME" by Coaplen et al., and assigned to the assignee of the present application, the disclosure of which is hereby incorporated by reference in its entirety.

FIELD OF THE INVENTION

Embodiments of the present technology relate generally to a crown portion of a fork assembly.

BACKGROUND

Presently, the ability to adjust performance characteristics in an air spring portion of a suspension are an ongoing challenge. These challenges include the effect of different environments, vehicles, performance requirements, rider skill level, rider comfort requirements, available use area on the particular suspension, and the like. Moreover, the transition between different vehicle uses, e.g., downhill versus uphill, road versus gravel versus off-road, etc. can drive the need for different air spring suspension characteristics based on the ride, based on the bike, to be modifiable during the ride, etc.

BRIEF DESCRIPTION OF THE DRAWINGS

Aspects of the present invention are illustrated by way of example, and not by way of limitation, in the accompanying drawings, wherein:

FIG. 6A is a side view of crown with a switch including a moveable portion, in accordance with an embodiment.

FIG. 6B is an orthogonal cutaway view of a crown with a switch, in accordance with an embodiment.

FIG. 6C is a top cutaway view of a crown with a switch, in accordance with an embodiment.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, objects, and circuits have not been described in detail as not to unnecessarily obscure aspects of the present disclosure.

As stated above, in some vehicles, a steerer tube is ultimately coupled to a wheel of a vehicle via a crown and a fork leg. For purposes of brevity and clarity, the following discussion will refer to embodiments of the present invention corresponding to the crown and the fork leg. It should be noted, however, that various embodiments of the present invention are well suited for use in a fork assembly having a single fork leg and/or a fork assembly having two fork legs.

As will be described in detail below, embodiments of the present invention provide a heretofore nonexistent fluid chamber having an air volume located at a crown portion of a fork assembly.

Figure 1:
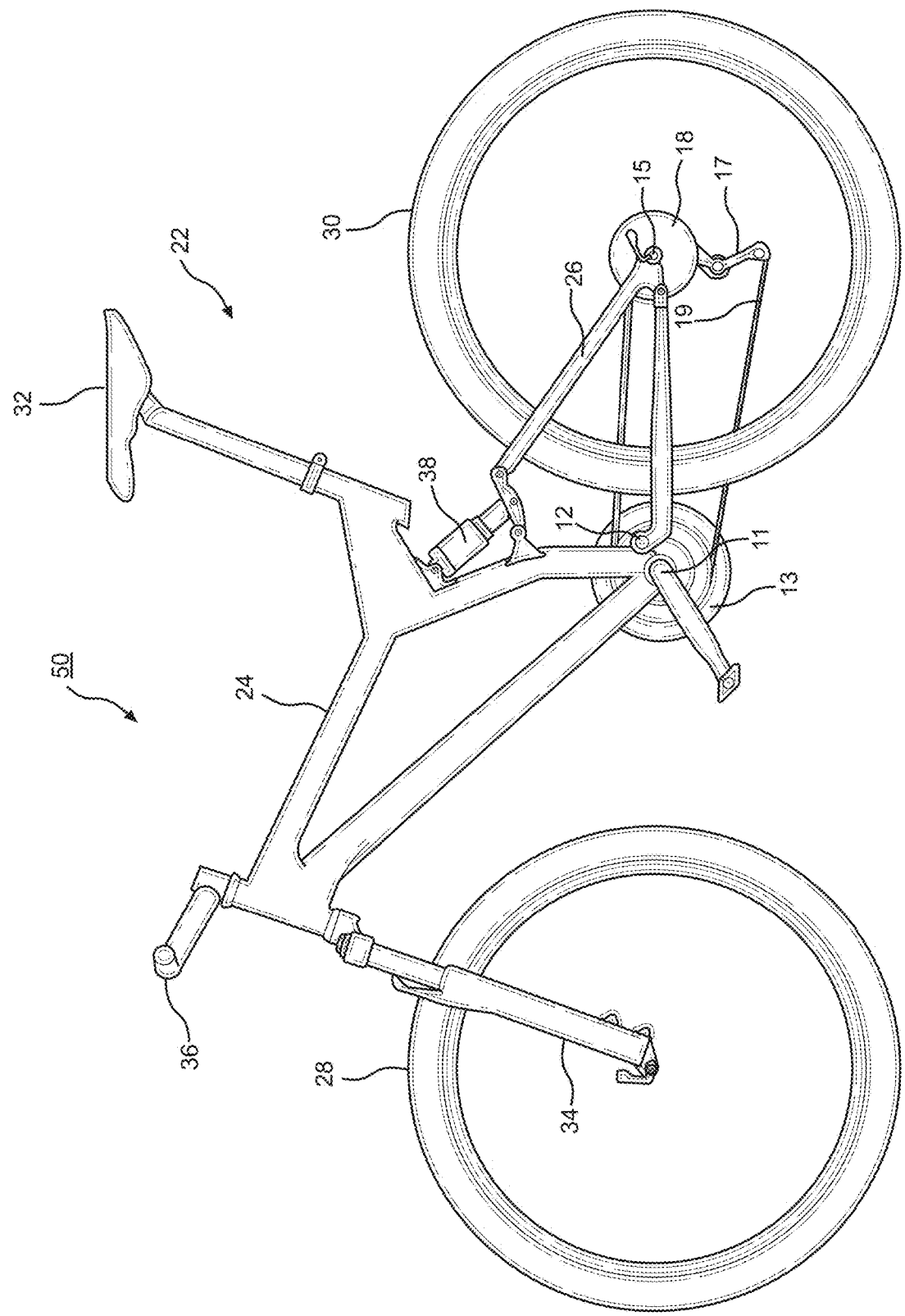
FIG. 1 is a perspective view of a bicycle having an air spring, in accordance with an embodiment.

Referring now to FIG. 1, a perspective view of a bicycle 50 having an air spring, shown in accordance with an embodiment. Bicycle 50 includes a main frame 24 with a suspension system comprising a swing arm portion 26 that, in use, is able to move relative to the rest of main frame 24; this movement is permitted by, inter alia, a rear shock 38. The front fork 34 also provides a suspension function via a damping assembly in at least one fork leg; as such the bicycle 50 is a full suspension bicycle (such as an MTB or mountain bike), although the embodiments described herein are not limited to use on full suspension bicycles.

In general, the term "suspension system" is intended to include vehicles having front suspension, rear suspension, or both front and rear suspension. In one embodiment, swing arm portion 26 is pivotally attached to the main frame 24 at pivot point 12 which is located above the bottom bracket axis 11. Although pivot point 12 is shown in a specific location, it should be appreciated that pivot point 12 can be found at different distances from bottom bracket axis 11 depending upon the rear suspension configuration. In one embodiment, the use and/or location of the pivot point 12 as shown herein is provided for purposes of clarity. Bottom bracket axis 11 is the center of the pedal and front sprocket assembly 13. Bicycle 50 includes a front wheel 28 which is coupled to the main frame 24 via front fork 34 and a rear wheel 30 which is coupled to the main frame 24 via swing arm portion 26. A seat 32 is connected to the main frame 24 in order to support a rider of the bicycle 50.

The front wheel 28 is supported by front fork 34 which, in turn, is secured to the main frame 24 by a handlebar assembly 36. The rear wheel 30 is connected to the swing arm portion 26 of the frame 22 at rear wheel axis 15. A rear shock 38 is positioned between the swing arm portion 26 and the main frame 24 to provide resistance to the pivoting motion of the swing arm portion 26 about pivot point 12. Thus, the illustrated bicycle 50 includes a suspension member between swing arm portion 26 and the main frame 24 which operate to substantially reduce rear wheel 30 impact forces from being transmitted to the rider of the bicycle 50.

Bicycle 50 is driven by a chain 19 that is coupled with both front sprocket assembly 13 and rear sprocket 18. As the rider pedals the front sprocket assembly 13 is rotated about bottom bracket axis 11 a force is applied to chain 19 which transfers the energy to rear sprocket 18. Chain tension device 17 provides a variable amount of tension on chain 19.

In one embodiment, the air spring assembly is located within the front fork 34. Although the following discussion refers to the air spring assembly in context of a bicycle, and specifically in the front fork 34 of the bicycle, it should be appreciated that the air spring assembly could be used in different suspensions and in different vehicles such as, but not limited to a bicycle, motorcycle, ATV, jet ski, car, etc. Moreover, although a number of components are shown in the disclosed figures, it should be appreciated that one or more of the components of the air spring assembly could be fixed or could be interchangeable. Further, one or more of the components could be adjusted, modified, removed, added, or exchanged for personal reasons, for performance reasons, for different applications (e.g., road, downhill, offroad, uphill, etc.), for different vehicles, and the like.

Figure 2:
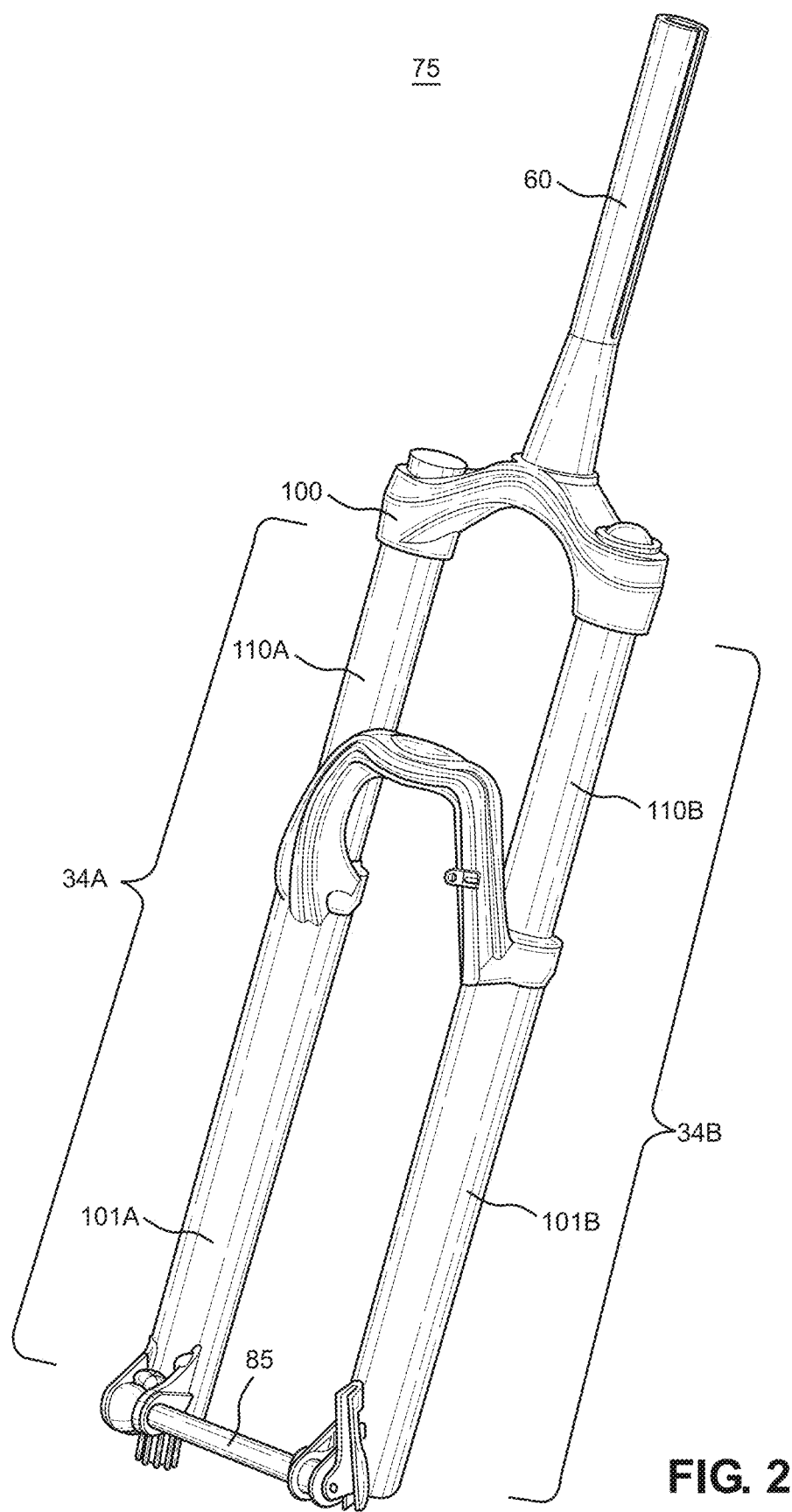
FIG. 2 is a perspective view of a fork assembly including a steerer tube, a crown, and a fork, in accordance with an embodiment.

Referring now to FIG. 2, a perspective view of coupled with fork assembly 75 is shown in accordance with an embodiment. In one embodiment, fork assembly 75 includes a steerer tube 60, a crown 100, a fork leg 34a, and a fork leg 34b. An axle 85 is shown at the lower portion of the fork assembly 75. The axle 85 would be placed through the center of a front wheel and about which the front wheel rotates. In one embodiment, e.g., a duel legged fork setup, axle 85 is removably coupled to fork leg 34a and fork leg 34b, thereby coupling the front wheel to the fork assembly 75.

In one embodiment, fork leg 34a includes an upper fork tube 110a and a lower fork tube 101a telescopically coupled together to form a fork fluid chamber. In one embodiment, fork leg 34a includes a damper within the fork fluid chamber. In one embodiment, fork leg 34b includes an upper fork tube 110b and a lower fork tube 101b telescopically coupled together to form a fork leg with a fork fluid chamber. In one embodiment, fork leg 34a includes an air spring assembly within the fork fluid chamber.

Although FIG. 2 shows two fork legs, e.g., 34a and 34b, coupled with crown 100, in one embodiment, there may only be a single leg coupled with crown 100. In one embodiment, the fork(s) are fixedly coupled with the crown during the assembly process. Thus, the fork(s) would be aligned with the crown 100 at the time of assembly. In one embodiment, one, some, or all of the forks and crown 100 could be metal, composite, could be built as a single composite component, could be a single piece-metal form, or the like.

Figure 3:
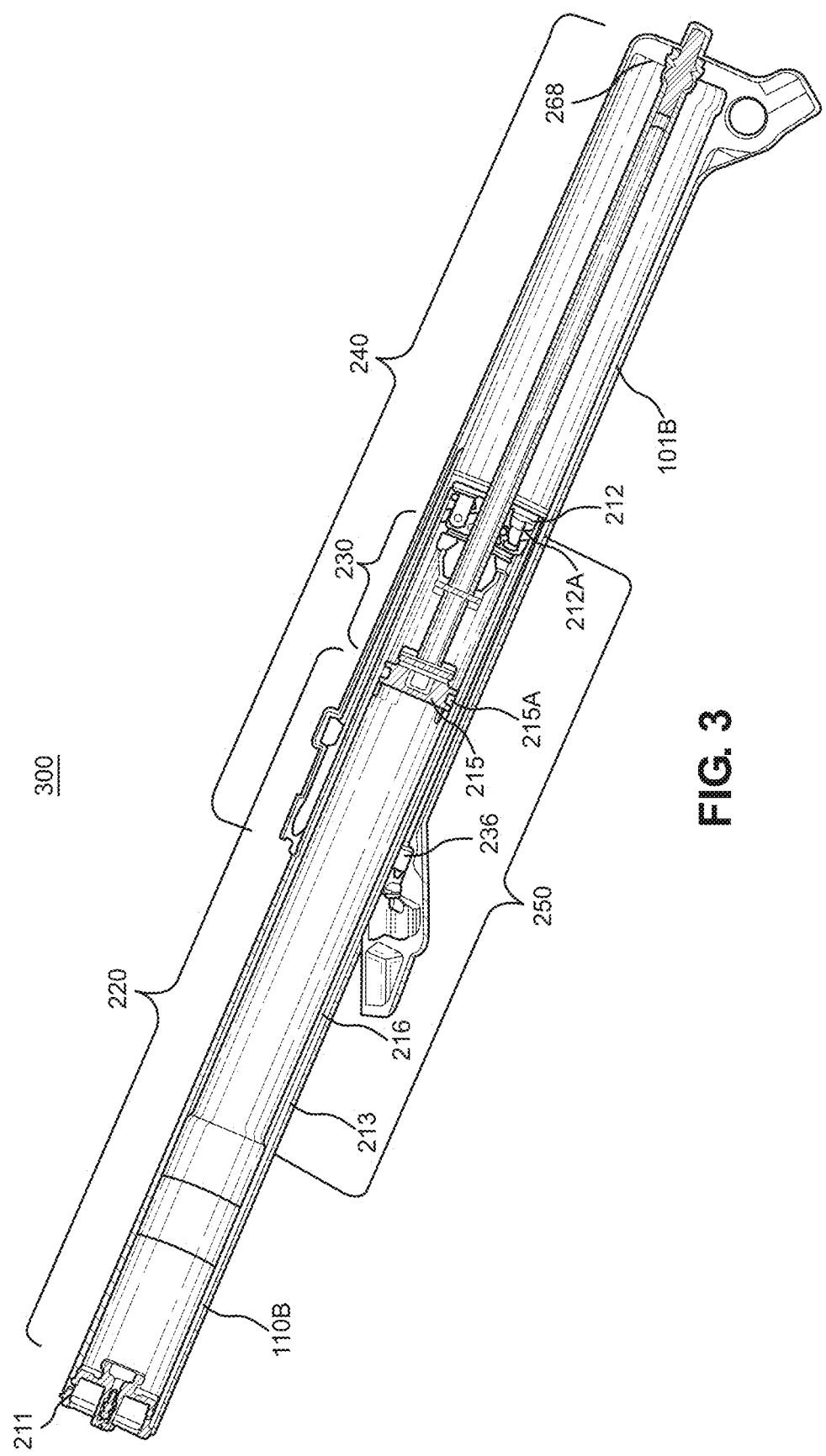
FIG. 3 is a cross-sectional view of an exemplary air spring assembly found in a fork, in accordance with an embodiment.

Referring now to FIG. 3 a cross-sectional view of an air spring assembly 300 is shown in accordance with an embodiment. Air spring assembly 300 includes a top cap 211, a lower fork tube 101b, an upper fork tube 110b, a partial cartridge tube 216, a partial cartridge tube gas seal 213, a movable piston 215 with a piston gas seal 215a, a base 212 with a base gas seal 212a, a positive air spring volume 220, a negative air spring volume 230, a lower leg gas volume 240, and an annular gas volume 250.

The positive air spring volume 220 is at the top of the air spring and includes the area from the top cap 211 (or to the top of partial cartridge tube 216) and within partial cartridge tube 216 to piston gas seal 215a on movable piston 215. The negative air spring volume 230 includes the space below piston gas seal 215a on movable piston 215 down toward base gas seal 212a on the base 212 within partial cartridge tube 216. The lower leg gas volume 240 is defined as the space from the gas seal 236 to atmosphere at the top of lower fork tube 101b, about the exterior of upper fork tube 110b, to the bottom 268 of the air spring assembly 300.

In one embodiment, the positive air spring is the volume that is compressed as the movable piston 215 is driven upward during a compression of the fork. Thus, as the fork compresses-the positive air spring volume 220 compresses. The negative air spring volume 230 is the volume that is expanded as the movable piston 215 is driven upward during a compression of the fork. Thus, as the fork compresses-the negative air spring volume 230 expands. In one embodiment, the positive air spring volume 220 and the negative air spring volume 230 communicate at one or more position(s)/stroke(s) through an internal bypass channel.

In one embodiment, partial cartridge tube 216 can be an integral part of the fork (such as fork leg 34b of FIG. 2) or it can be a removably coupleable part that is axially added to the internals of the upper fork tube 110b. For example, the air spring could have a main piston seal on the inner diameter of upper fork tube 110b. In another embodiment, a cartridge air spring is used. In general, a cartridge air spring is completely separable from the fork leg 34b. In other words, it can be removed from the fork and it would still be an air spring. In general, the cartridge air spring is coaxial and is a cartridge that threads (or is otherwise coupled) into a fork tube of the fork.

In one embodiment, air spring assembly 300 is filled with air. However, in another embodiment, the air spring assembly 300 (or a portion thereof) could be filled with many different types of fluid, instead of air. The fluid could be one of an assortment of gasses (such as regular air, nitrogen, helium, carbon dioxide, and the like.) Similarly, the fluid could be a liquid. However, for purposes of clarity in the following discussion, the term "air spring fork" will be used as a generic term for the air spring assembly 300, which could refer to air, or to one or more of the assortments of gasses, fluid, or the like.

Figure 4A:
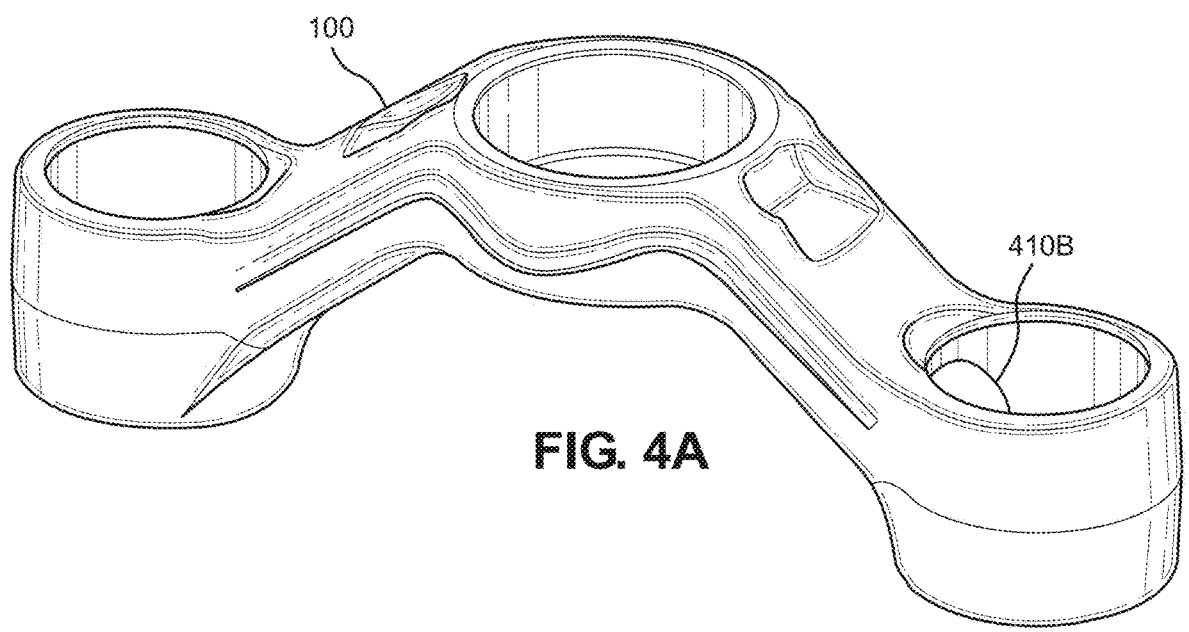
FIG. 4A is an orthogonal view of a crown with crown fluid chamber(s), in accordance with an embodiment.

Referring now to FIG. 4A, an orthogonal view of a crown 100 with one or more crown fluid chamber(s) is shown in accordance with one embodiment. In air spring forks, for example, the need for fluid volume is often limited to the available space. Thus, there is a constant compromise between the best performance fluid volume, and the available fluid volume. The following discussion utilizes a portion of crown 100 to obtain previously non-existent fluid chambers (e.g., one or both of crown fluid chamber(s) 400a and/or 400b) for providing additional fluid volume to the upper fork tube(s).

In one embodiment, the crown fluid chamber (e.g., crown fluid chamber 400b) is formed as a cavern or bore type opening partially into crown 100, such that it only has a single fork side opening 410b. The cavern or bore type opening is be formed as part of a cast, milling, or the like used to manufacture crown 100. In one embodiment, the cavern or bore type opening is milled (or otherwise formed) after crown 100 is initially formed. In one embodiment, a lining, or the like is added to the cavern or bore type opening to form a fluid tight crown fluid chamber. In one embodiment, the material used to form crown 100 is non-porous enough to form a fluid tight crown fluid chamber 400b.

Figure 4B:
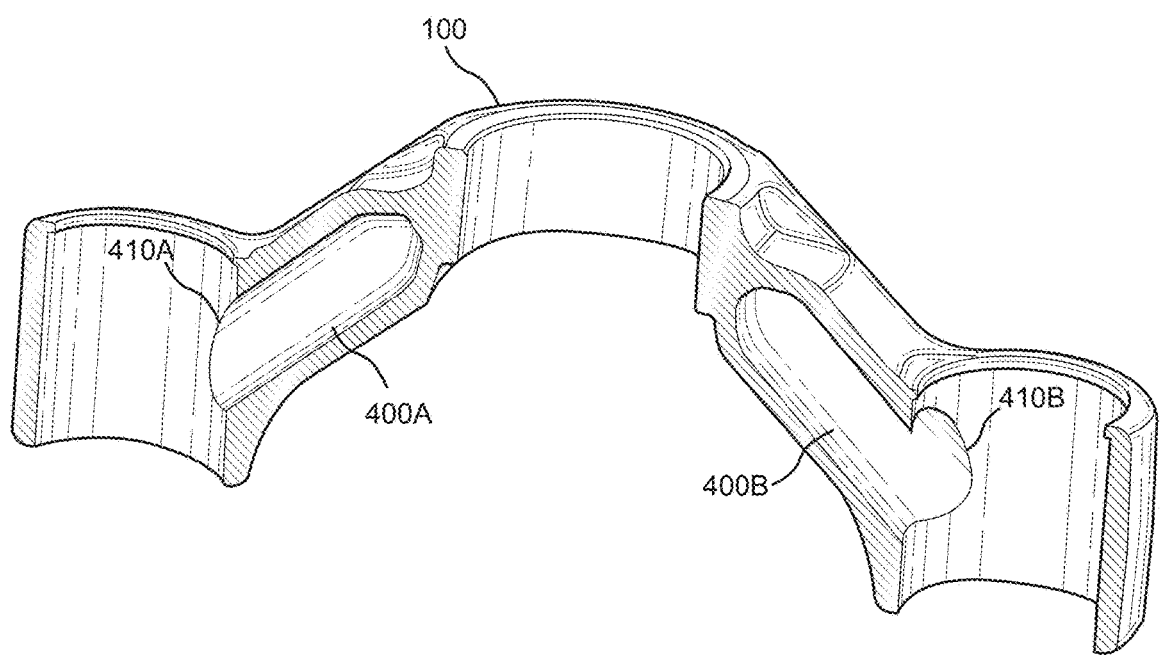
FIG. 4B is a cutaway view of a crown with one or more crown fluid chamber(s), in accordance with an embodiment.

With reference now to FIG. 4B a cutaway view of a crown 100 with crown fluid chamber 400a and crown fluid chamber 400b is shown in accordance with one embodiment. Although two fluid chambers are shown, it should be appreciated that in one embodiment, crown 100 will only have a single crown fluid chamber 400b. In one embodiment, crown 100 will only have a single crown fluid chamber 400a. In one embodiment, the crown fluid chamber 400a and crown fluid chamber 400b of crown 100 could be coupled via a fluid flow path thereby forming a single crown fluid chamber out of the combination of crown fluid chamber 400a and crown fluid chamber 400b.

With reference now to both FIGS. 4A and 4B, in one embodiment, a crown 100 is shown with a fork side opening 410b therein. As shown in FIG. 4B, the fork side opening 410b provides access to a crown fluid chamber 400b having a defined air volume within crown 100. Further, in one embodiment, crown 100 can also have an opening 410a which provides access to a crown fluid chamber 400a by an upper fork tube 110a. The crown fluid chamber 400a having a defined air volume within crown 100.

Figure 5A:
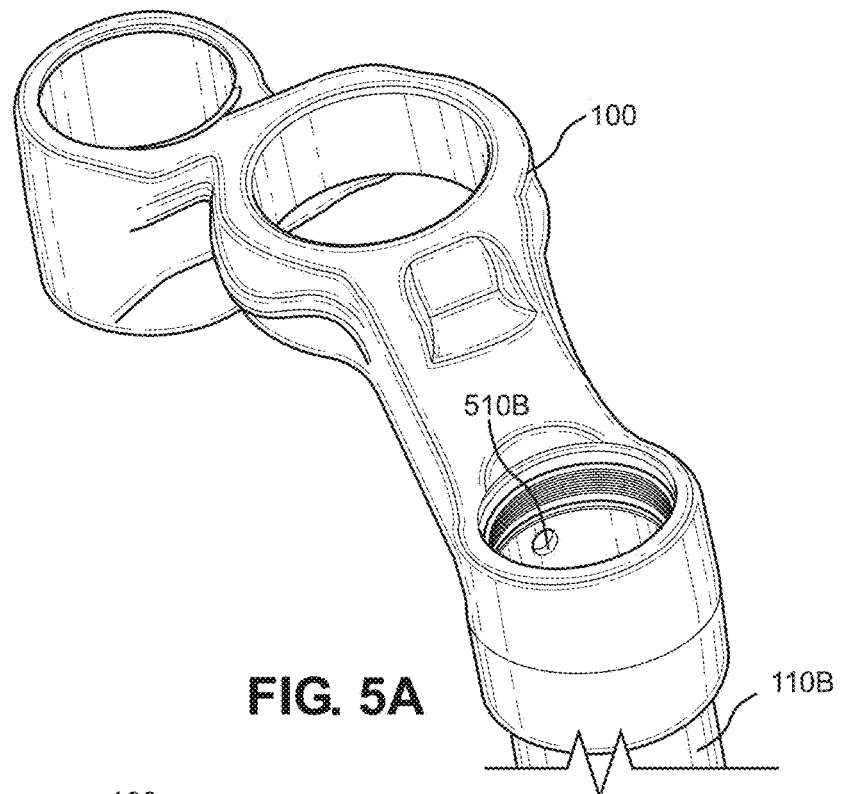
FIG. 5A is an orthogonal view of a crown with an upper fork tube, in accordance with an embodiment.
Figure 5B:
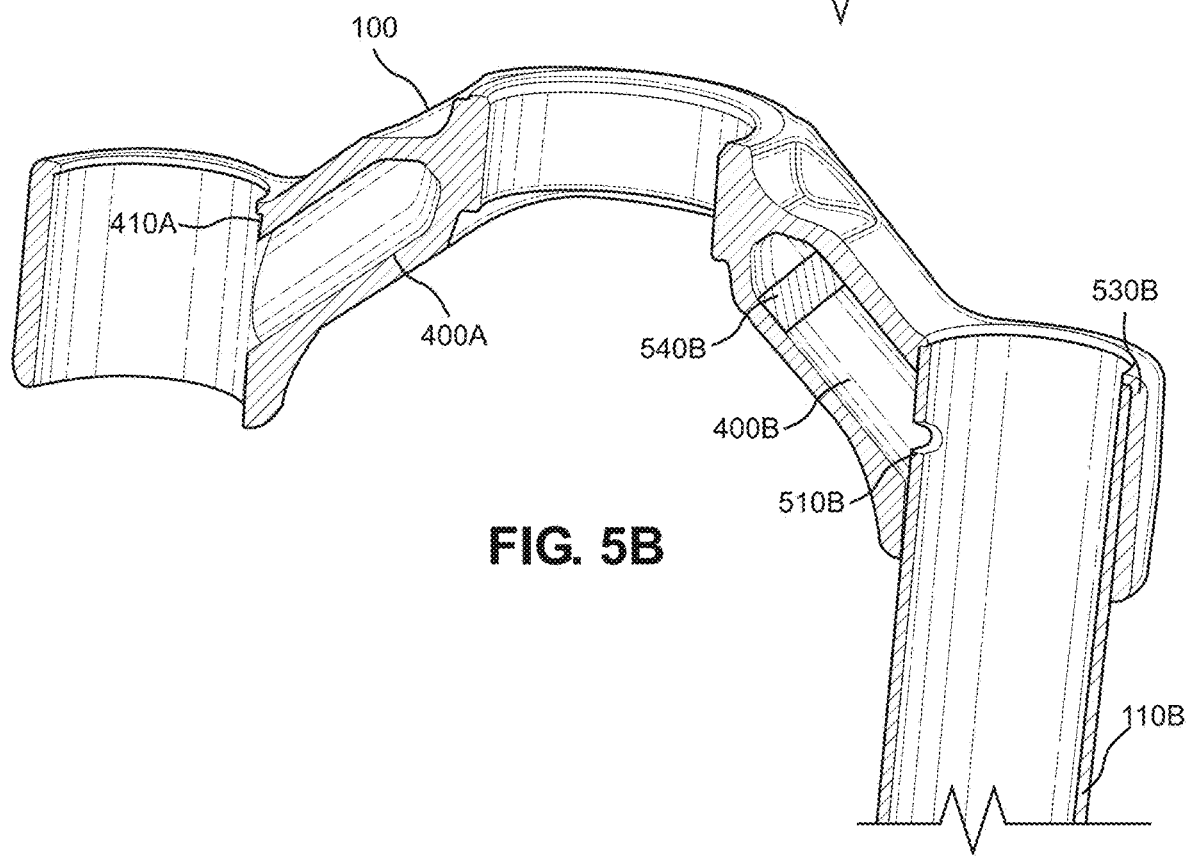
FIG. 5B is a cutaway view of a crown with an upper fork tube, in accordance with an embodiment.

Referring now to FIG. 5A, an orthogonal view of a crown 100 with an upper fork tube 110b is shown in accordance with one embodiment. With reference now to FIG. 5B a cutaway view of a crown 100 with an upper fork tube 110b is shown in accordance with one embodiment.

With reference now to both FIGS. 5A and 5B, in one embodiment, the fork side opening 410b in crown fluid chamber 400b is made available to the upper fork tube 110b via a port 510b. In one embodiment, once the upper fork tube 110b is installed, the crown fluid chamber 400b will be accessible by the upper fork tube 110b via port 510b. Although the following discussion mostly focuses on fork leg 34b, unless otherwise stated, it is for purposes of clarity and it should be appreciated that similar openings, ports, alignment, manufacture, assembly, and the like could be used on either fork side (e.g., fork leg 34a and/or fork leg 34b).

In one embodiment, the upper fork tube 110b has a series of holes (or ports such as port 510b) such that the upper fork tube 110b can be in fluid communication with the air volume in crown fluid chamber 400b after installation of the upper fork tube 110b with the crown 100. In one embodiment, the series of holes in the upper fork tube 110b could consist of different sized air holes such that the upper fork tube 110b could be rotated (during assembly or reassembly) to provide a different orifice size for port 510b between upper fork tube 110b and fork side opening 410b in crown fluid chamber 400b.

In one embodiment, the upper fork tube 110b is clocked with respect to port 510b and/or the crown 100 is clocked with respect to the fork side opening 410b, such that before installation, the upper fork tube port(s) will be aligned with fork side opening(s). As such, once upper fork tube 110b is fixedly coupled with crown 100, there will be fluid communication between upper fork tube 110b and crown fluid chamber 400b. In one embodiment, the clocking is a mark (such as an alignment mark) on the upper fork tube 110b, the crown 100, or both the upper fork tube 110b and crown 100. In one embodiment, the clocking is a tab on the outer diameter (OD) of the upper fork tube 110b and/or a corresponding alignment groove in an inner diameter (ID) of the fork tube opening of crown 100.

In one embodiment, there are one or more hermetic seals 530b used when crown 100 and upper fork tube 110b are coupled during the assembly process (e.g., press fit, 3D printed, or the like) to ensure that there is no fluid loss or leakage between the crown air volume in crown fluid chamber 400b and the upper fork tube 110b. In one embodiment, there may be a volume spacer 540b in the crown 100 crown fluid chamber 400b to allow a volume sizing capability for the volume of crown fluid chamber 400b. Although a volume spacer 540b is shown, in one embodiment, a bladder or other size modifiable spacing device may be used in crown fluid chamber 400b to allow a volume sizing capability for the volume of crown fluid chamber 400b. In one embodiment, if there is a bladder or other size modifiable spacing device, there will also be a bladder valve (or the like) accessible via an exterior portion of the crown to modify the size thereof.

In one embodiment, coupling the fluid volume of the crown fluid chamber 400b to the upper fork tube 110b will provide an effective increase in volume that would be similar to the volume found in an approximately 10 mm longer upper fork tube 110b. Thus, in one embodiment, the crown fluid chamber 400b allows for a reduction in the length of upper fork tube 110b without reducing performance (e.g., using the 10 mm example, the upper fork tube could be 10 mm shorter). In one embodiment, the crown fluid chamber 400b allows for a significant increase in performance using the same length of upper fork tube 110b having access to crown fluid chamber 400b. In one embodiment, the crown fluid chamber allows for both an increase in performance while also using a somewhat reduced length upper fork tube 110b (e.g., using the 10 mm example, the upper fork tube could be 5 mm shorter).

Figure 5C:
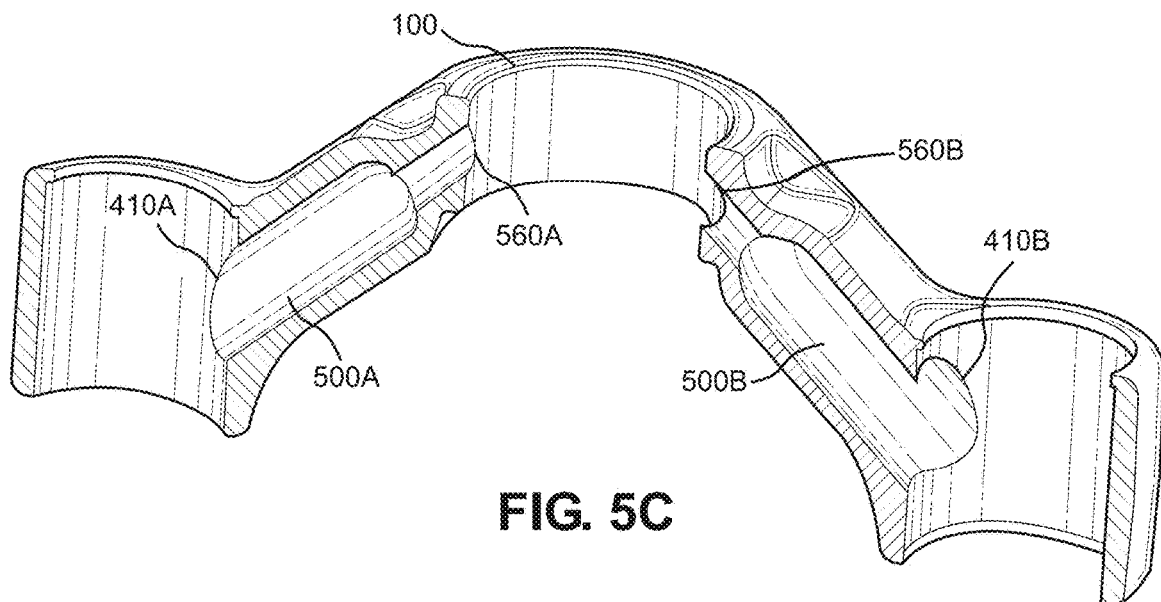
FIG. 5C is a cutaway view of a crown with one or more crown fluid holes, in accordance with an embodiment.
Figure 5D:
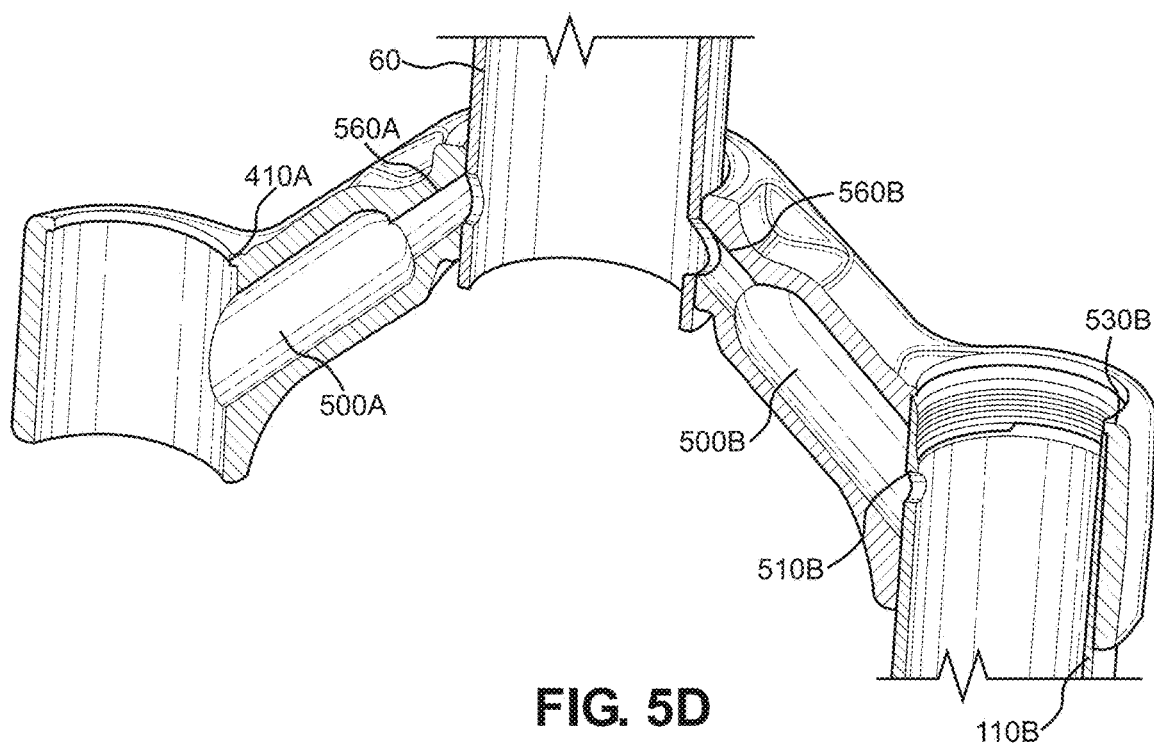
FIG. 5D is a cutaway view of a crown with one or more crown fluid holes coupled with an upper fork tube and a steerer tube, in accordance with an embodiment.
Figure 5E:
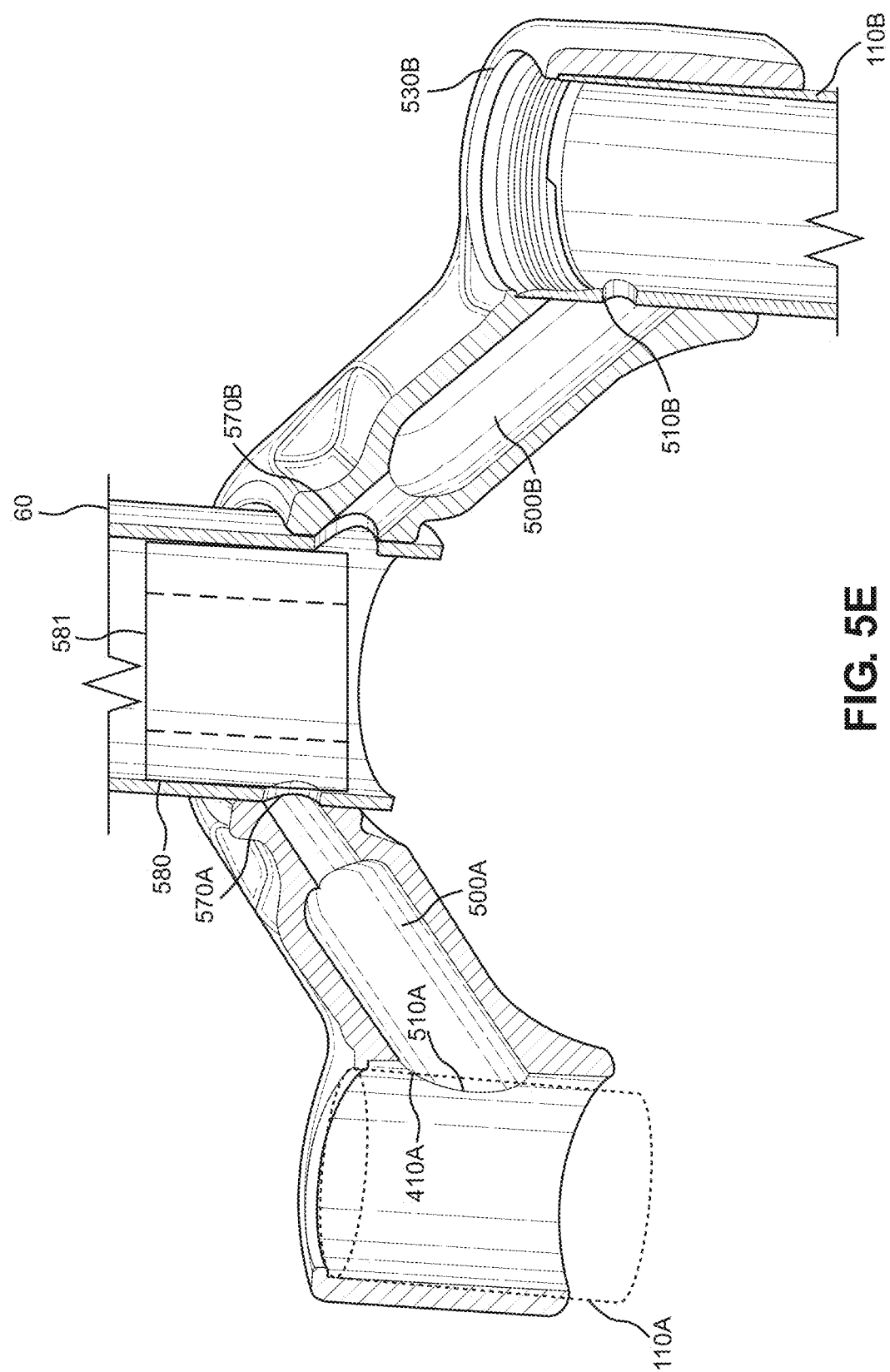
FIG. 5E is a cutaway view of a crown with one or more crown fluid holes coupled with an upper fork tube and a steerer tube with a fluid chamber therein, in accordance with an embodiment.

Although, one embodiment describes the crown fluid chamber 400b as adding a fluid volume that would be similar to a 10 mm longer tube, in one embodiment, the volume of the crown fluid chamber is adjustable depending upon the size of crown fluid chamber 400b, any spacers therein, whether it is coupled with crown fluid chamber 400a, or if there are additional fluid chamber available such as the steerer tube 60 fluid chamber as shown in FIG. 5E.

One embodiment, as shown in FIGS. 4B and 5B, couples the air spring side of the upper fork tube 110b with the crown fluid chamber 400b on the air spring side. In another embodiment, as shown in FIGS. 4B and 5B, the air spring side of upper fork tube 110b is fluidly coupled to the crown fluid chamber 400b on the air spring side and the crown fluid chamber 400a is fluidly coupled to the upper fork tube 110a on the damper side.

In one embodiment, the crown fluid chamber 400a and crown fluid chamber 400b are fluidly connected and the system can use air spring pressure from upper fork tube 110b to pressurize the damper in upper fork tube 110a.

In one embodiment, when both sides of crown fluid chamber 400a and crown fluid chamber 400b of crown 100 are in some type of fluid communication, as the air spring pressure is increased in upper fork tube 110b, it would increase the pressure on the other upper fork tube 110b to provide increased damping pressure, and vise-versa.

Referring now to FIG. 5C, a cutaway view of a crown 100 with one or more crown fluid holes is show in accordance with an embodiment. In the discussion of FIGS. 4A-5B, the fluid chamber (e.g., crown fluid chamber 400b and/or crown fluid chamber 400a) were formed as a cavern or bore type opening partially into crown 100, such that the chamber only has a single fork side opening 410b.

In contrast, in FIGS. 5C-5E, the fluid chamber (e.g., crown fluid chamber 500b and/or crown fluid chamber 500a) were formed as through hole that passes through an arm of crown 100, such that the fluid chamber 500b has a fork side opening 410b as well as a steerer tube side opening 560b. Similarly, the fluid chamber 500a has a fork side opening 410a as well as a steerer tube side opening 560a.

Although two fluid chambers are shown, it should be appreciated that in one embodiment, crown 100 will only have a single crown fluid chamber 500b. In one embodiment, crown 100 will only have a single crown fluid chamber 500a. In one embodiment, crown 100 will have both crown fluid chamber 500a and crown fluid chamber 500b.

In one embodiment, the tunnel, bore hole, or the like, is formed as part of a cast, milling, or other process used to manufacture crown 100. In one embodiment, the tunnel, bore hole, or the like is milled, drilled, or otherwise formed, as a second step, e.g., after crown 100 is initially formed. In one embodiment, a lining, or the like is added to the through hole to form a fluid tight internal air chamber. In one embodiment, the material used to form crown 100 is non-porous enough to form a fluid tight crown fluid chamber 500b.

With reference now to FIG. 5D, a cutaway view of crown 100 with crown fluid chamber 500b coupled with an upper fork tube 110b and a steerer tube 60 is shown in accordance with an embodiment.

In one embodiment, the through bore crown fluid chamber 500b is sealed on one side (e.g., steerer tube side opening 560b) by the installation of steerer tube 60. In one embodiment, the through bore crown fluid chamber 500a is sealed on one side (e.g., steerer tube side opening 560a) by the installation of steerer tube 60.

In one embodiment, the steerer tube is pressed into the crown 100 during manufacture of the fork assembly, causing the sealing of both steerer tube side opening 560a and steerer tube side opening 560b. In one embodiment, once the steerer tube 60 is installed, the crown fluid chamber 500b and/or crown fluid chamber 500a will be similar to crown fluid chamber 400a and crown fluid chamber 400b and will operate as such.

Referring now to FIG. 5E, a cutaway view of crown 100 with crown fluid chamber 500b coupled with an upper fork tube 110b, crown fluid chamber 500a coupled with upper fork tube 110a, and a steerer tube 60 with a steerer tube fluid chamber 580 therein is shown in accordance with an embodiment.

In one embodiment, instead of steerer tube 60 being used to seal both of steerer tube side opening 560a of crown fluid chamber 500a and steerer tube side opening 560b of crown fluid chamber 500b, some, part, or all of steerer tube 60 includes a steerer tube fluid chamber 580. In one embodiment, steerer tube fluid chamber 580 could be a circular chamber about the ID of steerer tube 60 such that steerer tube 60 has an axial opening 581 through a middle thereof.

In one embodiment, the steerer tube 60 has one or more steerer tube port 570a and/or steerer tube port 570a. In one embodiment, the steerer tube side opening 560b in crown fluid chamber 500b is made available to the steerer tube fluid chamber 580 via a steerer tube port 570b. In one embodiment, once the steerer tube 60 is installed, the crown fluid chamber 500b will be accessible to the steerer tube fluid chamber 580 via steerer tube port 570b. Although the following discussion uses the crown fluid chamber 500b side of the crown 100, unless otherwise stated, it is for purposes of clarity and it should be appreciated that similar openings, ports, alignment, manufacture, assembly, and the like could be used on either arm of crown 100.

In one embodiment, steerer tube 60 has a series of holes (or ports) such that the steerer tube fluid chamber 580 can be in fluid communication with the air volume in crown fluid chamber 500b after installation of steerer tube 60 with the crown 100. In one embodiment, the series of holes in steerer tube 60 could consist of different sized holes such that the steerer tube 60 could be rotated (during assembly or reassembly) to provide a different orifice size for steerer tube port 570b.

In one embodiment, steerer tube 60 is clocked with respect to steerer tube port 570a and/or steerer tube port 570b. Similarly, in one embodiment, crown 100 is clocked with respect to the steerer tube side opening 560a and/or steerer tube side opening 560b, such that before installation, the steerer tube port(s) will be aligned with the steerer tube side opening(s). As such, once the steerer tube 60 is fixedly coupled with crown 100, there will be fluid communication between steerer tube fluid chamber 580 and one or both of the crown fluid chamber 500a and/or crown fluid chamber 500b. In one embodiment, the clocking is a mark (such as an alignment mark) on the steerer tube 60, the crown 100, or both the steerer tube 60 and crown 100. In one embodiment, the clocking is a tab on the outer diameter (OD) of the steerer tube 60 and/or a corresponding alignment groove in an inner diameter (ID) of the steerer tube opening in crown 100.

In one embodiment, there are one or more hermetic seals used when crown 100 and steerer tube 60 are coupled during the assembly process (e.g., press fit, 3D printed, or the like) to ensure that there is no fluid loss or leakage between the crown air volume in crown fluid chamber 500b and the steerer tube fluid chamber 580. In one embodiment, there may be a volume spacer, bladder or other size modifiable spacing device, used in steerer tube fluid chamber 580 to allow a volume sizing capability for the volume of steerer tube fluid chamber 580. In one embodiment, if there is a bladder or other size modifiable spacing device, there will also be a bladder valve (or the like) accessible via an exterior portion of the steerer tube 60 and/or crown 100 to modify the size thereof.

In one embodiment, coupling the fluid volume of the crown fluid chamber 500b with the steerer tube fluid chamber 580, and the upper fork tube 110b will provide an even larger effective increase in volume than the volume of only crown fluid chamber 500b and upper fork tube 110b. As such, in one embodiment, the additional fluid volume will allow for a reduction in the length of upper fork tube 110b without reducing performance, a significant increase in performance using the same length of upper fork tube 110b, or both an increase in performance while also using a somewhat reduced length upper fork tube 110b.

Referring now to FIG. 6A, a side view of crown 100 with a switch 610 including a moveable switch portion 620 is shown in accordance with an embodiment. Referring now to FIG. 6B, an orthogonal cutaway view of a crown 100 with a switch 610 is shown in accordance with one embodiment. With reference now to FIG. 6C, a top cutaway view of a crown 100 with a switch 610 is shown in accordance with one embodiment.

In one embodiment, FIG. 6B includes a crown 100, upper fork tube 110b, crown fluid chamber 400b, port 510b, and a switch 610. In one embodiment, switch 610 includes a fluid pathway 630 and a moveable switch portion 620.

In one embodiment, fluid pathway 630 connects crown fluid chamber 400b with port 510b of upper fork tube 110b to provide a controlled fluid connection therebetween. In one embodiment, moveable switch portion 620 is used to automatically and/or manually open or close fluid flow via fluid pathway 630. In so doing, a rider can control the amount of air volume available to upper fork tube 110b and thus air spring assembly 300. Thus, in one embodiment, fluid pathway 630 ports the air spring side of the upper fork tube 110b to the crown volume on the air spring side through a selectable switch, so the crown volume acts as a crown fluid chamber 400b. In one embodiment, the switch could be a manual switch, an electronic switch, or the like.

In one embodiment, instead of simply opening or closing fluid pathway 630, moveable switch portion 620 of switch 610 can be used to partially obstruct (e.g., partially open, partially close, etc.) fluid pathway 630 to control the flow rate of the fluid passing therethrough. In so doing, the switch 610 would act in a similar manner as the different sized ports discussed herein. Thus, depending upon the position of moveable switch portion 620 with respect to fluid pathway 630, the air spring could have free access, limited access, or no access to the volume of crown fluid chamber 400b. Such control could be used by a rider to provide damping and or rebound modification to the air spring performance.

Although only one side of crown 100 is shown, in one embodiment, a switch is provided in the fluid pathway that connects crown fluid chamber 400a with port 510a of upper fork tube 110b to provide a controlled fluid connection therebetween. In one embodiment, a plurality of switches can be provided between any/all of the defined volumes to add external adjustment to the total air volume.

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the Claims.

Reference throughout this document to "one embodiment," "certain embodiments," "an embodiment," "various embodiments," "some embodiments," or similar term, means that a particular feature, structure, or characteristic described in connection with that embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What we claim is:

1. A crown comprising:
at least one crown fluid chamber comprising:
a first volume;
a fork side opening, said fork side opening for fluidly coupling said at least one crown fluid chamber with at least one fluid spring chamber of a fork leg to provide an additional amount of available fluid volume to said at least one fluid spring chamber; and
a switch coupled with said fork side opening, said switch to open or close said fork side opening to control a fluid flow between said at least one crown fluid chamber and said at least one fluid spring chamber of said fork leg.

2. The crown of claim 1 wherein said switch is an adjustable switch configured to adjustably obstruct a portion of said fork side opening to provide an adjustable flow rate of said fluid flow between said at least one crown fluid chamber and said at least one fluid spring chamber of said fork leg.

3. The crown of claim 1 further comprising:
a volume spacer within said at least one crown fluid chamber, said volume spacer to provide a volume change to said at least one crown fluid chamber.

4. The crown of claim 1 further comprising:
a bladder within said at least one crown fluid chamber, said bladder to provide a volume adjustment capability to said at least one crown fluid chamber; and
a bladder valve, said bladder valve to modify a size of said bladder, said bladder valve accessible via an exterior portion of said crown.

5. The crown of claim 1 further comprising:
an opening alignment mark on said crown, said opening alignment mark to indicate a location of said fork side opening, said opening alignment mark used at a time of manufacture to align said fork side opening with a port fluidly coupled with said at least one fluid spring chamber of said fork leg.

6. The crown of claim 1 further comprising:
a second crown fluid chamber, said second crown fluid chamber distinct from said at least one crown fluid chamber; and
a fluid pathway to fluidly couple said second crown fluid chamber with said at least one crown fluid chamber.

7. The crown of claim 1 wherein the at least one crown fluid chamber further comprises:
a steerer tube side opening, said steerer tube side opening fluidly sealed when a steerer tube is coupled with said crown.

8. The crown of claim 1 wherein the at least one crown fluid chamber further comprises:
a steerer tube side opening, said steerer tube side opening for fluidly coupling said at least one crown fluid chamber with a steerer tube fluid chamber of a steerer tube to provide an additional amount of available fluid volume to said at least one crown fluid chamber.

9. A fork assembly comprising:
a steerer tube;
a crown fixedly coupled with said steerer tube; said crown comprising:
a fork side opening;
a steerer tube side opening;
at least one crown fluid chamber having a first fluid volume; and
at least one fork leg fixedly coupled with said crown, said at least one fork leg comprising:
a lower fork tube and an upper fork tube, said lower fork tube and said upper fork tube telescopically coupled to form a fork fluid chamber having a second fluid volume; and
said upper fork tube having at least one opening therein, said at least one opening to provide access to said fork fluid chamber; and
said fork side opening configured to provide a flow path between said at least one crown fluid chamber and said fork fluid chamber, said fork side opening to establish a third fluid volume available to said fork fluid chamber.

10. The fork assembly of claim 9 further comprising:
a fluid spring operationally contained within said fork fluid chamber; and
at least one hermetic seal at said fork side opening, said at least one hermetic seal to provide a fluid seal between said at least one crown fluid chamber and said at least one opening in said upper fork tube.

11. The fork assembly of claim 9 further comprising:

a switch coupled with said fork side opening, said switch to open or close said fork side opening to control a fluid flow between said at least one crown fluid chamber and said fork fluid chamber, wherein when said switch is closed said fork fluid chamber has said second fluid volume, and when said switch is open said fork fluid chamber has said third fluid volume.

12. The fork assembly of claim 11 wherein said switch is an adjustable switch configured to adjustably obstruct a portion of said fork side opening to provide an adjustable flow rate of said fluid flow between said at least one crown fluid chamber and said fork fluid chamber.

13. The fork assembly of claim 11 wherein said switch is a manual switch.

14. The fork assembly of claim 11 wherein said switch is an electric switch.

15. The fork assembly of claim 9 further comprising:

a volume spacer within said at least one crown fluid chamber, said volume spacer to provide a volume change to said first fluid volume.

16. The fork assembly of claim 9 further comprising:

a bladder within said at least one crown fluid chamber, said bladder to provide a volume adjustment capability of said first fluid volume; and a bladder valve, said bladder valve to modify a size of said bladder, said bladder valve accessible via an exterior portion of said fork assembly.

17. The fork assembly of claim 9, further comprising:

a fork side opening alignment mark on said crown, said fork side opening alignment mark indicating a location of said fork side opening; and a fork fluid chamber alignment mark on said at least one fork leg indicating a location of said at least one opening in said upper fork tube, wherein said fork side opening alignment mark is aligned with said fork fluid chamber alignment mark to obtain a predefined orientation when said at least one fork leg is fixedly coupled with said crown at a time of manufacture.

18. The fork assembly of claim 9, further comprising:
said crown comprising:
  at least a second crown fluid chamber having a fourth fluid volume; and
  a fluid pathway to fluidly couple said second crown fluid chamber with said at least one crown fluid chamber to establish a fourth fluid chamber.

19. The fork assembly of claim 9, wherein said upper fork tube of said at least one fork leg further comprises:

a plurality of different sized openings therein, each of plurality of different sized openings to provide access to said fork fluid chamber, wherein said upper fork tube is rotatable with respect to said fork side opening to provide a selection of different orifice size options between said at least one crown fluid chamber and said fork fluid chamber, said selection of different orifice size options to provide an adjustable flow rate between said at least one crown fluid chamber and said fork fluid chamber.

* * * * *